United States Patent
Wilder

[15] 3,649,305
[45] Mar. 14, 1972

[54] PROCESS FOR PREPARING FROZEN FRENCH FRIED POTATO SEGMENTS

[72] Inventor: Curtis J. Wilder, Portland, Oreg.
[73] Assignee: Lamb-Weston, Inc., Portland, Oreg.
[22] Filed: Mar. 25, 1969
[21] Appl. No.: 810,328

[52] U.S. Cl. ................................... 99/207, 99/193, 99/100
[51] Int. Cl. ..................... A23b 7/03, A23b 7/04, A23L 1/12
[58] Field of Search ................... 99/100, 207, 193, 204, 199, 99/103

[56] References Cited

UNITED STATES PATENTS

| | | | |
|---|---|---|---|
| 2,901,359 | 8/1959 | Forknev | 99/204 |
| 3,044,880 | 7/1962 | Bogyo | 99/100 |
| 3,050,404 | 8/1962 | Traisman | 99/193 |
| 3,175,914 | 5/1965 | Vahlsing | 99/100 |
| 3,397,993 | 8/1968 | Strong | 99/100 |

OTHER PUBLICATIONS

Potato Processing, Talburt & Smith Av. Publication Co., 1967 page 353

*Primary Examiner*—Norman Yudkoff
*Assistant Examiner*—Martin G. Mullen
*Attorney*—Buckhorn, Blore, Klarquist & Sparkman

[57] ABSTRACT

A process for preparing frozen french fried potatoes which when finish fried closely resemble french fried potatoes prepared directly from fresh potatoes, in which potatoes are peeled, trimmed, cut into french fry sized strips, washed, dehydrated without prior blanching to remove a substantial amount of moisture, blanched in steam, partially fried, and then frozen.

4 Claims, No Drawings

PROCESS FOR PREPARING FROZEN FRENCH FRIED POTATO SEGMENTS

BACKGROUND OF THE INVENTION

This invention relates to the preparation of potato strips suitable for french frying and, more particularly, to the preparation of such strips which are frozen prior to being finished fried.

The use of partially fried, frozen strips of potatoes suitable for finish frying into a french fried potato strip is steadily increasing since the process is economical and efficient and permits the retailer to market a relatively standard product. A difficulty with the practice, however, has resided in the fact that frozen french fried potatoes when finish fried differ in color, texture, and most importantly, in flavor and taste from french fried potatoes prepared directly from fresh potatoes. The difficulty has inhibited sale of frozen french fried potatoes notwithstanding their other many advantages.

The present invention concerns itself with a process for preparing frozen french fried potatoes which when finish fried by the final user or retailer, will closely simulate french fried potatoes prepared from fresh potatoes in color, texture, flavor and odor.

DESCRIPTION OF PREFERRED EMBODIMENTS

In accordance with this invention, potatoes are held in storage under conventional, normal accepted conditions so as not to accumulate excessive amounts of sugar therein. They are then peeled, trimmed, sorted, and cut into french fry sized strips of about three-sixteenths inch to nine-sixteenths inch in cross section. The strips are then thoroughly washed to remove the free starch remaining on the surface caused by the rupturing of the potato cells in the cutting process. If desired, the sugar content of the potato strips may be adjusted by well-known means at this point in the process.

The potato strips are then immersed in a water solution preferably containing 0.75 percent sodium acid pyrophosphate or 0.1 percent sodium bisulfite or other commercially acceptable discoloration inhibitor for about five minutes to inhibit discoloration.

The strips are then dehydrated without prior blanching to effect a weight loss of from 10 to 30 percent depending upon the surface texture desired. Such dehydration is carried out at a temperature of between 150° to 350° F. and preferably take place by placing the strips in circulating air at a temperature of about 190° F. which may be supplemented with infrared heating. A period of about eight minutes has given desirable results. During the dehydration, moisture is removed from the strips both internally and from the surfaces thereof. The preferable weight loss is about 20 percent of the original weight of the strips.

The potato strips are then blanched in steam preferably at atmospheric pressure. The blanching may replace some of the moisture removed by the prior dehydration step, depending on the temperatures of the steam and strips, such that the net weight loss of the strips may remain the same or be reduced to about 16 percent of their original weight. A desirable length of blanching time is 7½ minutes for one-fourth inch shoestring cuts.

The strips are then partially deep fat fried for from about 30 seconds to about 90 seconds in an oil bath at a temperature of from about 300° to about 400° F. Preferably the strips are so fried for about 60 seconds at a temperature of about 325° F. During this partial frying step, additional moisture is removed from the strips.

After partial frying, the strips are then frozen such as by subjecting them to currents of cool air followed by subfreezing air temperatures, or the strips may be frozen by subjecting them to subfreezing air temperatures directly or by immersing in Freon or liquid nitrogen or other acceptable freezing method. In either event, the strips are cooled to a temperature of at least 0° F., thereby to freeze them.

When the frozen product is prepared by the retailer or the final user, it is preferably immersed in a suitable frying oil for about 1½ to about 3 minutes, the oil being at a temperature of from about 325° to about 375° F. A preferable time for finish frying is 2¼ minutes at 350° F. The final product resembles french fried potatoes prepared directly from fresh potatoes in quality, color, texture, and most importantly, in flavor and odor.

I claim:

1. In a process for preparing frozen french fried potatoes wherein said potatoes are first peeled, trimmed, cut into french fry sized strips and washed, the steps comprising:
   immersing said strips in a water solution containing means to inhibit discoloration;
   dehydrating said strips without prior blanching by placing the same in circulating air at a temperature of between about 150° and 350° F. to reduce the weight thereof by about 10 percent to about 30 percent of the original weight of said strips, the moisture being removed both internally of and from the surface of said strips, said dehydrating without prior blanching facilitating removal of said moisture from said strips by preventing gelatinization of starch granules therein;
   after dehydrating, then blanching said strips to replace some of the moisture removed by said dehydrating thereof, wherein the net weight loss of said strips remains the same or is reduced to a lesser percent of the original weight of said strips;
   after blanching, then frying said strips for from about 30 seconds to about 90 seconds in an oil bath at a temperature of from about 300° to about 400° F. further to reduce the moisture content of said strips and partially to fry the same; and
   after frying then freezing said strips by cooling them to a temperature of at least 0° F., whereby said strips when finish fried for about 1½ to about 3 minutes in an oil bath at a temperature of from about 325° to about 375° F. resemble in quality, color, texture, flavor and odor french fried potatoes prepared directly from fresh potatoes.

2. The process of claim 1 in which said strips are dehydrated by placing them in circulating air at a temperature of about 190° F. supplemented with infrared heating for a period of about 8 minutes to reduce the weight thereof by about 20 % of their original weight.

3. The process of claim 1 wherein said strips are blanched in steam at atmospheric pressure for about 7½ minutes.

4. The process of claim 1 in which said strips are fried after blanching by immersing them for about 60 seconds in an oil bath at a temperature of about 325° F.

* * * * *